O. CULLMAN.
EXPANSIBLE ROLLER.
APPLICATION FILED JUNE 14, 1909. RENEWED MAY 16, 1910.
965,160.
Patented July 26, 1910.
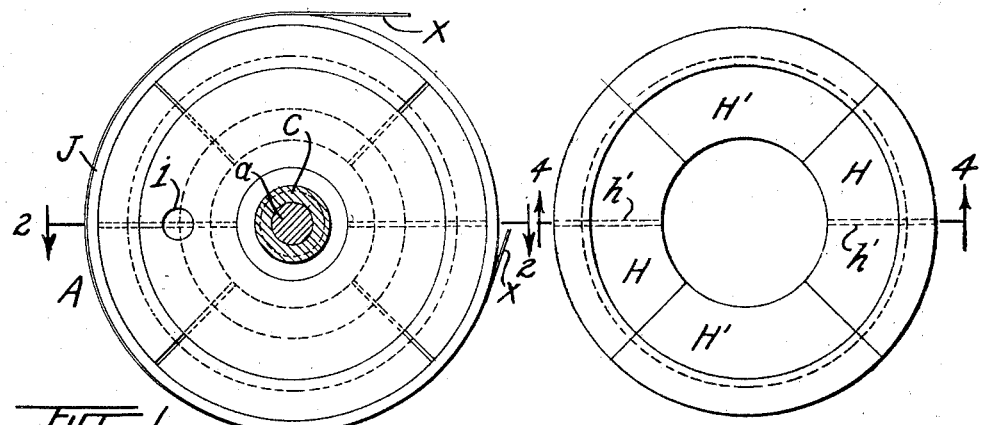
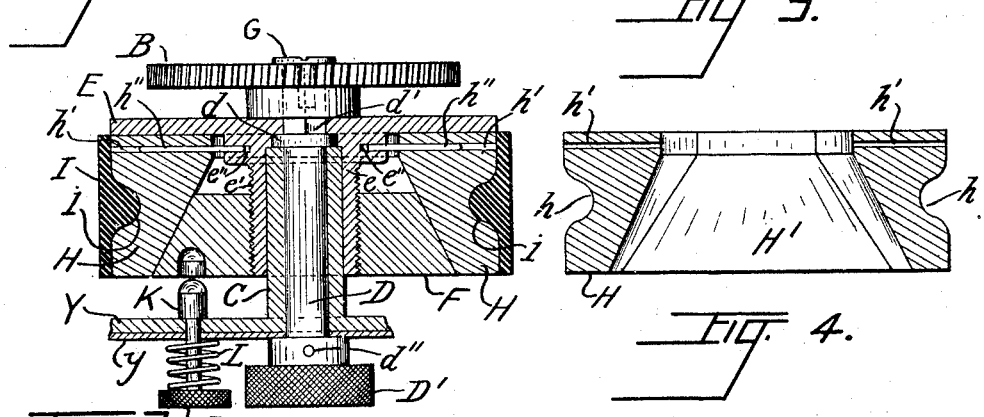
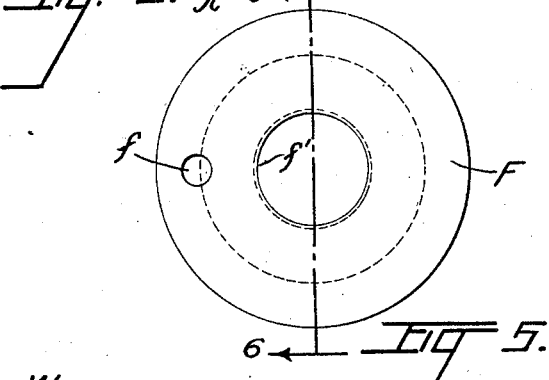
WITNESSES:
INVENTOR
Otto Cullman,
BY
Charles Turner Brown,
ATTORNEY

UNITED STATES PATENT OFFICE.

OTTO CULLMAN, OF CHICAGO, ILLINOIS.

EXPANSIBLE ROLLER.

965,160.  Specification of Letters Patent.  Patented July 26, 1910.

Application filed June 14, 1909, Serial No. 502,139. Renewed May 16, 1910. Serial No. 561,723.

*To all whom it may concern:*

Be it known that I, OTTO CULLMAN, a citizen of the United States, and a resident of Chicago, in the county of Cook and State of Illinois, have invented certain new and useful Improvements in Expansible Rollers, of which the following, when taken in connection with the drawing accompanying and forming a part hereof, is a full and complete description, sufficient to enable those skilled in the art to which it pertains to understand, make, and use the same.

This invention relates to an expansible roller arranged to be driven by mechanism connected to one of the wheels of a vehicle, to be actuated thereby, and said roller in turn arranged to actuate a ribbon map.

The object of the invention is to obtain a roller whereof the circumference may be varied, by adjustments forming a part of the device.

A further object of the invention is to obtain a device which is easily adjusted to obtain a determined relation between the periphery thereof and the periphery of the wheel by which, through intermediate mechanism, it is actuated.

A further object of the invention is to obtain a device which is simple in construction and durable.

In the drawing referred to Figure 1 is a side elevation of a device embodying the invention, showing the shaft and bearing of the device in cross section. Fig. 2 is a sectional view of the device on line 2—2 of Fig. 1, viewed in the direction indicated by the arrows. Fig. 3 is an elevation of a plurality of sectors forming elements in the device. Fig. 4 is a sectional view of the sectors illustrated in Fig. 3 on line 4—4 of Fig. 3, viewed in the direction indicated by the arrows. Fig. 5 is an end elevation of a frustum, forming an element of the device, and Fig. 6 is a sectional view on line 6—6 of Fig. 5.

A reference letter applied to indicate a given part is used to designate such part throughout the several figures of the drawing wherever the same may appear.

A is an expansible roller embodying the invention.

X is a short section of a ribbon map which is actuated by the roller A.

C is the journal bearing of the shaft of the roller A, and is mounted on base Y.

Roller A consists of the following named parts;—Axle or shaft D, provided with enlarged part $d$ and with the square end portion $d'$, said shaft arranged to turn in bearing C; knurled wheel D' mounted on one end of the shaft D and rigidly secured thereto by the pin $d''$; disk E having a square hole therein and provided with hub $e$; frustum F, provided with recess $f$ and screw threaded aperture $f'$; threaded screw G, fitting into corresponding screw threads in the squared end of shaft D; sectors H, H', and elastic band I. Longitudinal movement of shaft D in one direction is prevented by the enlarged part $d$ coming in contact with the end of journal bearing C, and said longitudinal movement in the other direction is prevented by the hub of knurled wheel D' coming in contact with the shell $y$ on base Y.

Hub $e$ of disk E is provided with external screw threads $e'$ thereon and with radial holes $e''$. The square portion $d'$ of shaft D extends through the square hole in disk E and through the square hole in gear B, so that the turning of said gear turns the shaft and the turning of the shaft turns said disk. The hub $e$ of disk E is provided with a hole so that said disk and hub may be placed over the journal bearing C and enlarged part $d'$ of the shaft D. When arranged as described so that the disk E and hub $e$ thereof turn with the shaft D, the journal bearing C, in addition to forming the bearing of shaft D also forms a beading of hub $e$, when the hole in said hub $e$ is made to fit the periphery of said bearing C. The disk E and gear wheel B are held rigidly in place on shaft D by the screw G. Sectors H, H, respectively, are provided with a groove $h$, and with a radial hole $h'$.

Frustum F is mounted on hub $e$ by means of internal screw threads $f'$ fitting screw threads $e'$ on said hub. The sectors H are respectively mounted on the frustum F with pins $h''$ in the radial apertures $h'$ and in the holes $e''$ of the hub $e$, and said sectors, together with sectors H', when mounted on frustum F are held in place thereon by elastic band I. Band I is made of elastic material preferably rubber, and is provided with internal rib $j$ fitting into groove $h$ of sectors H, H'.

To vary the peripheral length of the roller A, and thereby vary the distance which the ribbon X is moved on each rotation of said roller the frustum F is turned relative to the hub $e$, (without turning sectors H, H'), as such turning of said frustum moves it, by means of the screw threaded aperture $f'$ fitting screw threads $e'$.

To readily effect the required adjustment of the frustum F, I provide the pin K in base Y, longitudinally movable therein.

$k$ is a head on pin K and L is a spring arranged to hold said pin in a retracted position. When the pin K is forced forward (against the resiliency of spring L), and the roller A is turned (by knurled head D' or gear wheel B) so that recess $f$ is opposite said pin K, said pin may be forced into said recess and the frustum I thereby prevented from turning in unison with hub $e$. It is thereby moved longitudinally on the hub $e$.

The principal purpose of the band I is to hold the sectors H, H', closely to the frustum F.

Having thus described my invention what I claim as new and desire to secure by Letters Patent is:—

1. The combination of a base, a journal bearing on the base, a shaft rotatably mounted in the bearing, a disk secured to the shaft, said disk provided with a hub having a recess arranged to receive the journal bearing, a frustum on the hub, arranged to be adjustably movable thereon, said frustum provided with a recess on one face thereof, a movable latch on the base, means to yieldingly hold the latch retracted, said latch arranged to be movable into engagement with the recess in the frustum when forced forward, a plurality of parts mounted on the frustum, said parts arranged to be radially movable and to turn with the shaft, and means to hold said parts to the frustum, and means to manually turn the shaft.

2. The combination of a base, a journal bearing on the base, a shaft rotatably mounted in the bearing, a disk secured to the shaft, said disk provided with a hub having a recess arranged to receive the journal bearing, a frustum on the hub, arranged to be adjustably movable thereon, a plurality of parts mounted on the frustum, said parts arranged to be radially movable and to turn with the shaft, and means to hold said parts to the frustum.

3. An expansible roller consisting of a rotatably mounted shaft, a thumb wheel, a disk having a hub provided with screw threads mounted on the shaft to turn therewith, a frustum having an axial aperture provided with corresponding threads mounted on the screw threaded hub and arranged to be adjustably turned thereon and said frustum provided with a recess on one of the plane faces thereof, a plurality of radially movable parts mounted on the frustum and arranged to fit thereon, and to turn with the first named shaft, and an expansible band around the radially movable parts in combination with a latch arranged to engage with the recess in the face of the frustum, and means to yieldingly hold such latch out of engagement with said recess.

4. An expansible roller consisting of a rotatably mounted shaft, a thumb wheel, a disk having a hub provided with screw threads mounted on the shaft to turn therewith, a frustum having an axial hole provided with corresponding threads mounted on the screw threaded hub and arranged to be adjustably movable thereon, said frustum provided with a recess on one of the plane faces thereof, a plurality of parts mounted on the frustum and arranged to fit thereon, said hub and said parts respectively provided with radially extending apertures, pins in said radial apertures, said pins arranged to permit radial movement of said parts relative to said hub, and an expansible band around the last named parts in combination with a latch arranged to engage with the recess on the face of the frustum, and means to yieldingly hold such latch out of engagement with said recess.

5. In a roller, the combination of a rotatably mounted shaft, a thumb wheel, a disk provided with a hub having external screw threads thereon mounted on the shaft to turn therewith, a frustum provided with an axial aperture having internal screw threads corresponding with and mounted on the screw threaded hub, a plurality of radially movable parts mounted on the frustum and arranged to fit thereon and to turn with the first named shaft, and an expansible band around the radially movable parts, said frustum arranged to be turned on the hub to vary the circumference of the roller.

6. In a roller, the combination of a rotatably mounted shaft, a thumb wheel, a disk provided with a hub external screw threads thereon mounted on the shaft to turn therewith, a frustum provided with an axial aperture having internal screw threads corresponding with and mounted on the screw threaded hub, a plurality of radially movable parts mounted on the frustum and arranged to fit thereon and to turn with the first named shaft, and means to hold said radially movable parts to the frustum, said frustum arranged to be turned on the hub to move it along said hub.

7. In an expansible roller, the combination of a rotatably mounted shaft a thumb wheel, a disk provided with a hub having screw threads thereon mounted on the shaft to turn therewith, a frustum provided with an axial aperture having screw threads corresponding with and mounted on the screw threads of the hub, a plurality of radially movable parts mounted on the frustum, said hub and said movable parts respectively provided with radially extending apertures, pins in said apertures arranged to join said hub and said movable parts, means to hold said movable parts to the frustum, and said frustum arranged to be turned on the hub.

8. In an expansible roller, the combination of a rotatably mounted shaft, a thumb wheel, a disk provided with a hub having screw threads and mounted on the shaft to turn therewith, a frustum provided with an axial aperture having screw threads corresponding with and rotatably mounted on the screw threads of the hub, a plurality of radially movable parts mounted on the frustum and arranged to fit thereto, means to pin said parts to the disk to turn therewith, and means to hold said parts to the frustum.

9. In a roller, the combination of a rotatably mounted shaft, a plurality of means to rotate the shaft, a disk provided with a hub mounted on the shaft to turn therewith, a frustum mounted on the hub and arranged to be adjustably moved thereon, a plurality of sectors mounted on the frustum and respectively arranged to fit thereto, means to join the sectors to the disk to turn therewith and to permit radial movement thereof, and means to hold the sectors to the frustum.

OTTO CULLMAN.

In the presence of—
CHARLES TURNER BROWN,
CORA A. ADAMS.